United States Patent
Beaucoup

(10) Patent No.: US 7,991,146 B2
(45) Date of Patent: Aug. 2, 2011

(54) ANTI-HOWLING STRUCTURE

(75) Inventor: Franck Beaucoup, Dunrobin (CA)

(73) Assignee: Mitel Networks Corporation, Kanata, Ontario (CA)

( * ) Notice: Subject to any disclaimer, the term of this patent is extended or adjusted under 35 U.S.C. 154(b) by 1509 days.

(21) Appl. No.: 11/272,813

(22) Filed: Nov. 15, 2005

(65) Prior Publication Data

US 2007/0121928 A1     May 31, 2007

(51) Int. Cl.
*H04M 9/08* (2006.01)
(52) U.S. Cl. .................................. 379/406.04
(58) Field of Classification Search ............. 379/406.04
See application file for complete search history.

(56) References Cited

U.S. PATENT DOCUMENTS

| | | | |
|---|---|---|---|
| 6,240,180 B1 | 5/2001 | Younce et al. | |
| 6,580,696 B1 * | 6/2003 | Chen et al. | 370/286 |
| 6,590,974 B1 | 7/2003 | Remes | |
| 6,678,376 B1 * | 1/2004 | Takahashi et al. | 379/406.01 |
| 6,798,754 B1 | 9/2004 | Farhang-Bouroujeny | |
| 2003/0076949 A1 * | 4/2003 | Laberteaux | 379/406.05 |
| 2004/0161101 A1 | 8/2004 | Yiu et al. | |

FOREIGN PATENT DOCUMENTS

| | | |
|---|---|---|
| JP | 62-121318 | 12/1997 |
| JP | 11-008896 | 1/1999 |
| JP | 2001-016342 | 1/2001 |

OTHER PUBLICATIONS

J. Chambers, A. Constantinides, "Frequency tracking using constrained adaptive notch filters synthesised from allpass sections," Proc. of the IEE, vol. 137, No. 6, Dec. 1990.
S. Kuo, J. Chen, "New adaptive IIR notch filter and its application to howling control in speakerphone systems," Electronics Letters, vol. 28, No. 8, Apr. 1992.
K. Ochiai, T. Araseki, T. Ogihara, "Echo canceller with two echo path models," IEEE Trans. Commun., vol. COM-25, pp. 589-595, Jun. 1977.

* cited by examiner

*Primary Examiner* — Alexander Jamal

(57) ABSTRACT

A howling control structure for a full duplex communication system. The structure is implemented as part of an acoustic echo canceller having a conventional transversal adaptive filter. A second transversal adaptive filter, shorter than the conventional filter, that adapts even in the absence of speech in its reference signal, is provided. The short filter adapts quickly and provides enough echo cancellation to prevent howling from occurring, even if the echo path is changed significantly during silence periods.

19 Claims, 2 Drawing Sheets

ANTI-HOWLING STRUCTURE

FIELD OF THE INVENTION

The present invention relates generally to full-duplex communication systems, such as conference telephony systems. More particularly, the present invention relates to methods and apparatus for controlling howling in such systems.

BACKGROUND OF THE INVENTION

In full-duplex hands-free (FDHF) audio communication systems where, by definition, both communication paths are open at all time, howling can be a serious issue. Howling, which is also known as squealing or singing, can emerge in closed electro-acoustic loops when the total loop gain exceeds 0 dB at certain frequencies. In a typical FDHF communication system, such as shown in FIG. 1, echo paths 10 and 12, directly between the loudspeaker 14 and microphone 16, and due to the reverberant characteristics of the room in which the telephones A and B are located, respectively, are present at both the near and far ends. These echo, or coupling, paths create feedback loops. In systems where a digital-analog hybrid 18, as shown in FIG. 2, is present, the communication path introduces some feedback as a result of impedance mismatch. For instance, with analog hands-free telephones, the analog interface at the connection point to the public-switch telephone creates such a loop 20 on all calls. With telephones providing only half-duplex hands-free functionality, howling is not generally an issue because of the strong gain attenuation that is applied to at least one of the receive or transmit directions at any given time.

Prior techniques addressing the problem of howling in electro-acoustic loops in general, and in hands-free communications systems in particular, can be divided into four approaches. These approaches can be used on full-band signals, sub-band signals, or in the frequency domain as in WO 99/026355 to Farhang-Boroujeny, entitled Acoustic Echo Cancellation Equipped With Howling Suppressor And Double-Talk Detector.

The first approach uses switched loss based on uni-directional or bi-directional speech activity. An example of this approach can be found in JP 2001-016342 to Masuda et al., entitled Voice Changeover Device. The principle is to apply some gain attenuation to one or both directions depending on voice activity detection states, such as single talk, double-talk or double-silence. Essentially, the transmit gain is reduced when a receive signal is detected, or vice versa, and both transmit and receive gains are attenuated by a lesser degree in detected double-talk and double-silence states. This essentially means that the device operates as a hybrid between full-duplex and half-duplex, a concept sometimes referred to as "partially duplex".

In commercial phones, the proximity of the loudspeaker to the microphone, combined with the high gains that are needed to deliver sufficient volume to the users, result in considerable positive gain in the loop, typically in the range of 12-15 dB on each side. Therefore, the amount of switched loss that has to be applied to keep the loop stable is quite large, producing a significant half-duplex behavior of the telephone. In order to reduce this effect, the amount of loss can be decreased once the acoustic echo cancellation (AEC) filter has converged, relying on the cancellation provided by the AEC filter to keep the loop stable. This works well as long as the AEC filter does indeed provide significant echo cancellation. However, if the echo path changes, which happens for instance when the telephone user moves his hand between the loudspeaker and the microphone, or in the vicinity of the telephone, then the AEC filter does not any longer provide sufficient echo cancellation, and the loop can become unstable.

A second approach uses switched loss based on howling detection. Examples of this approach can be found in JP-11008896 to Tanaka et al., entitled Howling Prevention Device; and U.S. Pat. No. 6,590,974 to Remes, entitled Howling Controller. The general strategy in this approach is to design a howling detector, which can be a narrow-band signal detector or a more involved detector taking into account the dynamic behavior of the signal. Some amount of loss is then applied to one direction of the loop when the howling detector triggers. Other possible responses to the detection of a howling signal include forcing or speeding up the speed of adaptation of the AEC filter to help cancel feedback from the acoustic path.

The problem with this approach is that howling signals can present temporal and spectral that are very similar to speech signals. This is particularly true with high positive gains throughout a wide frequency range, because in such a case, the traditional assumption that howling is a narrow-band signal is not necessarily a valid assumption. It is, therefore, challenging to design a howling detector that combines low probability of miss and low probability of false trigger on speech. As a result, howling signals might not be detected fast enough or with a low enough probability of false detection on speech.

A third approach uses adaptive notch filters, as exemplified in JP 62-278898 to Honma et al., entitled Loudspeaker; J. Chambers, A. Constantinides, "Frequency tracking using constrained adaptive notch filters synthesised from allpass sections," IEEE Proceedings, Vol. 137, Pt. F. No. 6, December 1990; and S. Kuo, J. Chen, "New adaptive IIR notch filter and its application to howling control in speakerphone systems," Electronic Letters, Vol. 28, no 8, April 1992. The principle is to use an adaptive filter to detect and cancel periodic components of the signal in either direction of the loop. This can be interpreted as implicit periodic signal detection, since the convergence and coefficients of the adaptive filter do give information about the presence of periodic, or correlated, components in the signal. Many different techniques have been proposed using FIR, direct IIR, and cascaded adaptive filters. These techniques have been used to remove periodic components from a signal, or to remove line noise from periodic signals, a technique often referred to as adaptive line enhancement.

Although some level of improvement can be achieved using this approach, it is also limited when high positive gains are present in the loop throughout a wide frequency range because, as described above, howling signals may not be narrow-band, but can then present speech-like spectral characteristics. It is therefore very difficult, if not impossible, to design an adaptive notch filter that can attenuate the howling signals in such conditions without also attenuating parts of valid speech signals, and, thereby, introducing a penalty on the speech quality.

A fourth approach to controlling howling is to apply a frequency shift to the signal. Examples of this approach can be found in JP 62-278898 to Honma et al., entitled Loudspeaker; and M. Schroeder, "Improvement of acoustic-feedback stability by frequency shifting," J. Acoust. Soc. Am., 36(9), 1718-1724, 1964. The principle is to shift the spectrum of the signal in one or both directions of the loop by a few Hertz (e.g. 5 to 10 Hz to avoid significant deterioration in the speech quality). Because howling is due to frequencies being "caught" and amplified in the loop, this frequency shift has the effect of passing the recurring signal through the local peaks and valleys of the frequency-domain transfer function of the loop, thereby averaging the local extrema. Although this technique can help if only localized maxima of the feedback transfer function are above the critical point of 0 dB, it does not bring a significant improvement when high positive gains are present in the loop throughout a wide frequency range. Therefore, the frequency shift approach is not a satisfactory solution to controlling howling.

It is, therefore, desirable to provide a system and method for controlling howling in FDHF communication systems that does not compromise the full-duplex capabilities of system, that is not dependent on howling detection, and that is effective in situations where high positive gains are present in the electro-acoustic loop over a wide frequency range.

SUMMARY OF THE INVENTION

It is an object of the present invention to obviate or mitigate at least one disadvantage of previous methods and systems for controlling howling in audio communication systems.

According to a first aspect, the present invention provides an acoustic echo canceller having an anti-howling structure. The echo canceller comprises a first adaptive filter that provides acoustic echo cancellation in response to a reference signal, and produces a first error signal. A second adaptive filter, shorter than the first adaptive filter, provides a second error signal in response to the same reference signal. Switch logic selects the one of the first and second error signals having the lesser power. An adaptation controller for the second adaptive filter permits it to adapt during periods of double silence. In preferred embodiments, the first and second adaptive filters are transversal adaptive echo cancellation filters.

The adaptation controller can freeze operation of the second adaptive filter during near-end speech. It can also permit it to adapt only during periods when the first adaptive filter is frozen. Any suitable adaptation algorithm, such as a normalized least means square adaptation algorithm can be used in the filters. The length of the second adaptive filter is generally chosen in accordance with the known processing delay in the output and input buffers on the acoustic side of the loop. As a rule, it should be chosen as short as possible to provide the best performance in terms of convergence speed and misadjustment, while still covering for the "direct-path" acoustic echo path that amounts for most of the feedback energy.

In a further aspect, the present invention provides a method for suppressing howling in a full duplex communication system. The method includes applying adaptive echo cancellation, using a first adaptive filter, to determine a first error signal in response to a sampled signal; applying adaptive echo cancellation, using a second adaptive filter shorter than the first adaptive filter, to determine a second error signal in response to the same reference signal; and selecting the smaller of the first and second error signals for transmission to a far-end user.

In another aspect, there is provided an acoustic echo canceller for a full-duplex hands-free conference telephony device. The acoustic echo canceller comprises a first transversal adaptive echo cancellation filter that produces a first error signal in response to a reference signal. A second transversal adaptive echo cancellation filter, having fewer taps than the first transversal adaptive echo cancellation filter, adapts during periods of non-speech activity. A comparator determines which of the first and second error signals is a lower power signal, and a switch selects the lower power signal for transmission to a non-linear processor for post-processing.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

It appears howling occurs most frequently when the acoustic echo path is changed significantly, particularly during periods of silence. This is because, when significant speech is present in either direction, the respective echo cancellers, i.e. the acoustic echo canceller for the acoustic side and the line echo canceller for the hybrid side, tend to efficiently adapt and/or engage their post-processing block, often referred to as the non-linear processor (NLP), to attenuate the residual echo. As a result, the present invention concentrates on the feedback, or coupling, path that creates howling signals in the first place. An adaptive filter, such as a transversal adaptive filter, is used to cancel this feedback and adaptively track it even during periods of double silence.

Figure 1:
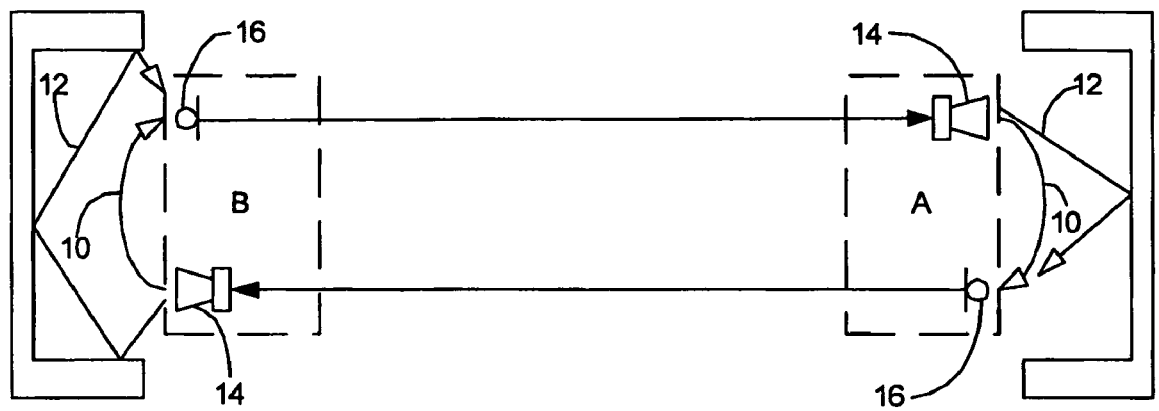
FIG. 1 depicts a full-duplex system with echo paths.
Figure 2:
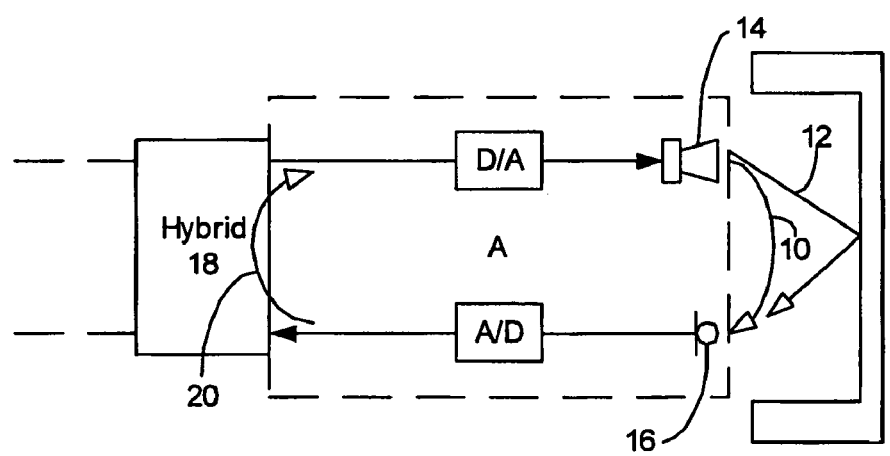
FIG. 2 depicts a hybrid system with echo paths.

Generally, the present invention provides a method and system for adaptive cancellation of howling in a full duplex communication system. In a presently preferred embodiment, the invention is implemented as part of an acoustic echo canceller and uses a short transversal adaptive echo cancellation filter that adapts even in the absence of speech in its reference signal, typically the receive signal. The short filter adapts quickly and provides enough echo cancellation to prevent howling from occurring, even if the echo path is changed significantly during silence periods, such as when a near-end user moves her hand towards the hands-free conference telephone. In any given telephone, such as the telephone A in FIG. 1, only the near-end, or acoustic, feedback path 10 and 12 can be efficiently cancelled, because the delay to the far-end feedback path is unknown and can be very large, particularly in the case of packet-based networks, such as IP telephony networks.

The short filter is implemented separately from the conventional long filter, because it must adapt even in the absence of speech in the reference signal. Though the existing long echo cancellation adaptive filter could be implemented to track changes in the echo path even during silence periods, the poor signal-to-noise ratio (SNR) between the echo signal and the uncorrelated near-end signal would cause the echo cancellation filter to diverge from its well-converged position achieved during speech periods with a high SNR. This is clearly not a desirable effect. Therefore, it is preferable to use a separate filter to track the acoustic echo path during silence periods when the echo cancellation filter does not normally adapt. The two error signals provided by the long and short filters are then compared and the signal with the lower power is chosen as the error signal.

Figure 3:
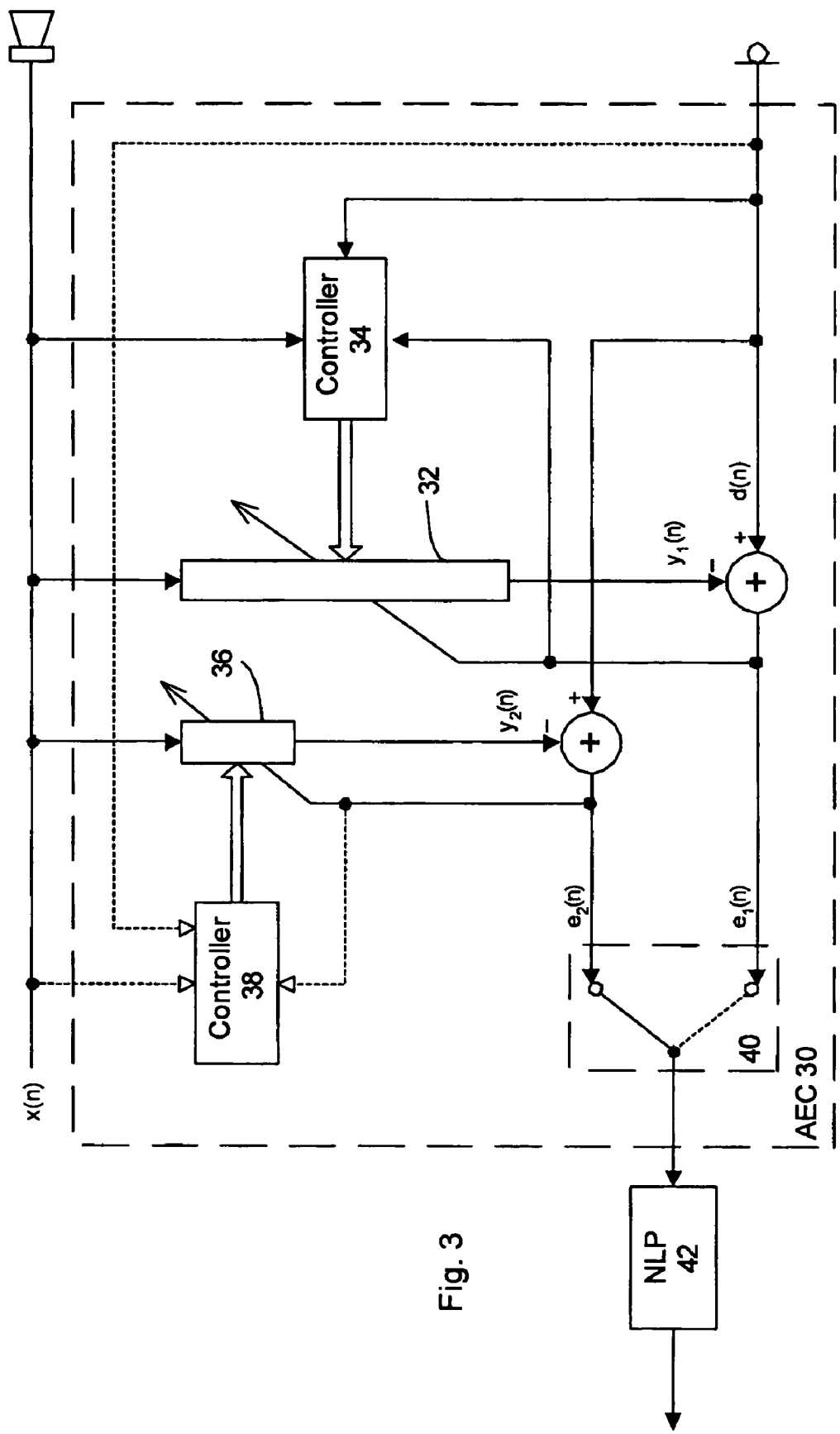
FIG. 3 is a schematic diagram of an echo canceller according to the present invention.

FIG. 3 is a schematic diagram of a hands-free device with an acoustic echo canceller (AEC) 30 incorporating a howling control structure according to an embodiment of the present invention. AEC 30 can be implemented in a digital signal processor (DSP), as is well-known in the art.

AEC 30 includes a first transversal echo cancellation filter 32, and its respective adaptation controller 34, to provide conventional echo cancellation in speech signals. A second shorter transversal echo cancellation filter 36, and its respective adaptation controller 38, provide the howling control in accordance with the present invention. A key aspect of the present invention is that the second, anti-howling transversal filter 36 is shorter than the echo cancellation filter 32, and is adapted even in the absence of speech in its reference signal. The short filter 36 can, therefore, track changes in the echo path even during periods of silence.

In operation, a reference signal x(n) is sampled by both filters 32 and 36. As shown, reference signal x(n) is the receive, or far-end signal. The first filter 32 adapts, under the control of the adaptation controller 34, in response to a first error signal $e_1(n)$, which is the difference between the near end signal d(n) and the estimated echo of the far-end signal $y_1(n)$. The near-end signal d(n) includes echo of the far-end signal and is influenced by changes in the echo path. The second filter adapts, under the control of its adaptation controller 38, in response to a second error signal $e_2(n)$, which is the difference between the near-end signal d(n) and the estimated echo $y_2(n)$ generated by the short adaptive filter 36. As will be apparent to those of skill in the art, the signals $y_1(n)$ and $y_2(n)$ are generated in response to the same reference signal x(n), but by different adaptive filters, under the separate control of their respective adaptation controllers. The adaptation controller 38 permits the second filter 36 to adapt even during periods of double silence, when the first filter will generally be frozen to avoid losing its convergence.

The two error signals, $e_1(n)$ and $e_2(n)$, are passed through a switch 40 that selects the smallest error signal to feed a non-linear processor (NLP) block 42. The switch 40 will typically include comparator logic for comparing the two signals to determine which has the least power, and means to select the lower power signal for transmission. Parallel-filter structures have been used previously to address such problems as divergence during double-talk, and the corresponding error-switch mechanisms can be used here. The switch logic for selecting the appropriate error signal can be implemented in any suitable manner, such as the conventional "twin filters" structures used to avoid divergence on double-talk (see e.g. K. Ochai, T. Araseki, T. Ogihara, "Echo canceller with two echo path models," IEEE Trans. Comm., vol. COM-25, pp. 589-595, June 1977).

To illustrate the fact that the anti-howling filter 36 adapts even in the absence of speech in the reference signal x(n), the signals fed to its control block 38 are shown as hashed lines. The controller 38 can also receive the near-end signal d(n), and will, preferably, freeze adaptation of the anti-howling filter 36 during near-end speech in order to avoid strong divergence. In a further embodiment, adaptation of the short anti-howling filter 36 can be carried out only when the main echo cancellation filter 32 does not adapt. This reduces the computational complexity of the echo canceller 30, and permits the howling control to be implemented with very little added complexity, namely only the filtering operation with the anti-howling filter, compared to a conventional echo cancelling structure.

Any suitable adaptive filtering algorithm can be used to adapt the anti-howling filter. The presently preferred algorithm is a full-band time-domain normalized least-mean squares (NLMS) algorithm, but any algorithm with low stationary misadjustment is expected to produce satisfactory results.

Analysis of the howling phenomenon reveals that only the reflections that take place very close to the telephone need to be cancelled to prevent the howling signal from growing. The reason for this is that the air-path attenuation that takes place before and after the far-away reflections attenuates the signal enough to bring loop levels well below the critical point for howling of 0 dB. Therefore, it is enough to use a short transversal filter as the anti-howling adaptive transversal filter 36. It is also desirable to use a short filter because it gives a better mix of convergence speed and low misadjustment. In a conventional echo canceller, sampling at a rate of 8 kHz, a long transversal filter with 1000 taps is commonly used. To control howling, a short filter with 100 taps has been found to provide satisfactory results. Analysis of the air-path attenuation validates this number. 100 taps corresponds to 12 ms, or 4 meters of travel, which in turn results in signal attenuation well over 20 dB and is enough to avoid positive gains in the acoustic loop. Choice of the correct short filter length is a matter of design and will depend on the expected total loop gain, as well as the signal processing delay, due to components such buffers and filters, present in the particular hands-free device.

In terms of adaptation step size, the anti-howling filter is subject to the usual compromise between speed of convergence and misadjustment. As a general rule, the step size must be large enough for the short filter to be able to track echo path changes such a hand moving in the vicinity of the phone, but also small enough that the filter can perform significant echo cancellation even in poor-SNR scenarios such as double-silence. For 100 taps and full-band time-domain NLMS, a step-size of 0.1 to 0.01 is believed appropriate for a wide range of SNR conditions.

It should be emphasized that the precise mechanism for controlling the operation of the short transversal filter 36 is not critical to the present invention, provided that anti-howling transversal filter 36 adapts even in the absence of speech in the reference signal x(n). This permits the short filter 36 to track changes in the echo path even during silence periods. Any appropriate control mechanism for a transversal filter, as are known to those of skill in the art, that allows for adaptation during periods of double silence fall within the scope of this invention. This includes the choice of the adaptation step size for the short adaptive filtering process, for which a variety of strategies can be implemented. For example, the adaptation step size can be chosen as a function of the SNR between the reference signal x(n) and the error signal $e_2(n)$ during double-silence periods.

Though the present invention has been described in terms of a FDHF conference telephony device, it is equally applicable to any full-duplex acoustic communication system. As will be apparent to those of skill in the art, the anti-howling structure of the present invention provides many advantages over previous howling control techniques. In particular, the present structure does not add significant computational complexity to the system, nor does it require a complex howling detector. It preserves full-duplex communication, and operates in situations where high positive gains are present in the electro-acoustic loop over a wide frequency range The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An echo canceller having an anti-howling structure, comprising:

a first adaptive filter to provide acoustic echo cancellation in response to a reference signal, and to produce a first error signal:

a second adaptive filter, shorter than the first adaptive filter, to provide a second error signal in response to the reference signal even in the absence of speech in the reference signal; and switch logic to select the one of the first and second error signals having the lesser power.

2. The echo canceller of claim 1, wherein the first and second adaptive filters are transversal adaptive echo cancellation filters.

3. The echo canceller of claim 1, further including an adaptation controller for the second adaptive filter, the adaptation controller permitting adaptation of the second adaptive filter during periods of double silence.

4. The echo canceller of claim 3, wherein the adaptation controller freezes operation of the second adaptive filter during near-end speech.

5. The echo canceller of claim 1, wherein the first and second adaptive filters implement a normalized least means square adaptation algorithm.

6. The echo canceller of claim 1, wherein the second adaptive filter is sized in accordance with the expected feedback loop gain.

7. The echo canceller of claim 6, wherein the second adaptive filter is further sized in accordance with a signal processing delay.

8. The echo canceller of claim 7, wherein the signal processing delay is attributable to signal processing components present in a hands-free device.

9. The echo canceller of claim 8, wherein the signal processing components include buffers and filters.

10. The echo canceller of claim 1, wherein the adaptation controller permits adaptation of the second adaptive filter only during periods when the first adaptive filter is frozen.

11. A method for suppressing howling in a full duplex communication system, comprising steps of:

applying adaptive echo cancellation, using a first adaptive filter, to determine a first error signal in response to a sampled signal;

applying adaptive echo cancellation, using a second adaptive filter shorter than the first adaptive filter, to determine a second error signal in response to the reference signal even in the absence of speech in the reference signal; and selecting the smaller of the first and second error signals for transmission to a far-end user.

12. The method of claim 11, wherein adaptation of the first adaptive filter is frozen during periods of double silence.

13. The method of claim 11, wherein the second adaptive filter adapts only when the first adaptive filter is frozen.

14. The method of claim 11, wherein adaptation of the second adaptive filter occurs during periods of double silence.

15. The method of claim 11, wherein adaptation of the second adaptive filter is frozen during near-end speech.

16. The method of claim 11, wherein the step of selecting includes comparing the first error signal to the second error signal to determine the one of the first and second error signal having the least power.

17. The method of claim 11, further including post-processing the selected signal.

18. The method of claim 11, wherein the first and second adaptive filters implement a normalized least means square adaptation algorithm.

19. An acoustic echo canceller for a full-duplex hands-free conference telephony device, comprising:

a first transversal adaptive echo cancellation filter to produce a first error signal in response to a reference signal;

a second transversal adaptive echo cancellation filter, having fewer taps than the first transversal adaptive echo cancellation filter, to provide a second error signal even in the absence of speech in the reference signal;

a comparator to determine which of the first and second error signals is a lower power signal;

a switch to select the lower power signal for transmission to a non-linear processor for post-processing.

\* \* \* \* \*